3,666,423
HEAT EXCHANGE APPARATUS
James R. Muenger, Beacon, N.Y., assignor to
Texaco Inc., New York, N.Y.
Filed Nov. 26, 1969, Ser. No. 880,255
Int. Cl. B01j 9/04
U.S. Cl. 23—288 L          3 Claims

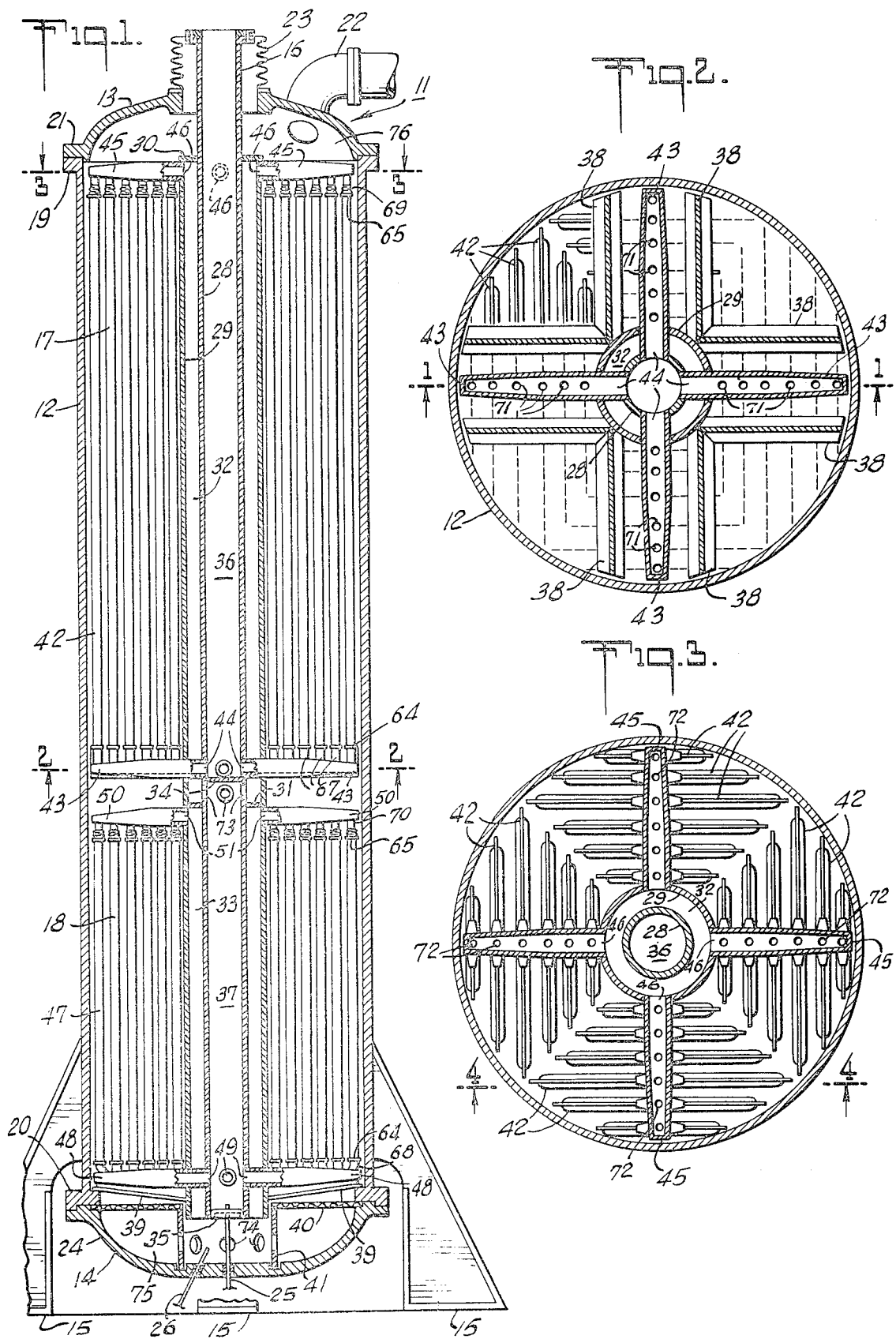

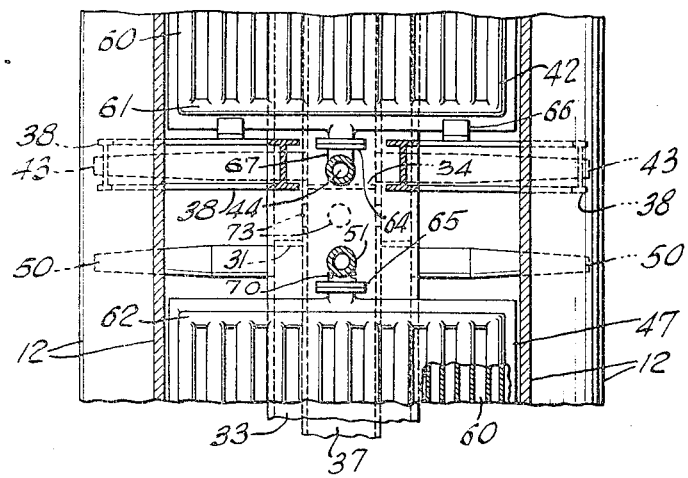

ABSTRACT OF THE DISCLOSURE

A heat exchange apparatus for a catalytic system comprising a closed cylindrical vessel containing an axial spine which extends substantially the length of said vessel, and a heat exchange means which is embedded in catalyst within said vessel, and is supported by said axial spine on a removable unit and is in communication therewith. Fresh feed gas is introduced into and discharged from said heat exchange means by way of said axial spine, finally being discharged into a chamber at the bottom of the vessel. The preheated feed gas stream is then passed from the bottom of the chamber up through the catalyst on the outside of said heat exchange means in indirect concurrent heat exchange with the fresh feed gas flowing within the heat exchange means and is finally discharged from an exit port in the top head of the vessel.

BACKGROUND OF THE INVENTION

Field of the invention

This invention relates to a novel heat exchanger. In one of its more specific aspects it relates to a shift converter containing a plurality of heat exchanger units.

Description of the prior art

The catalytic water-gas shift converter is widely used for the manufacture of hydrogen, gaseous mixtures of hydrogen and nitrogen used in the chemical synthesis of ammonia, and gaseous mixtures of hydrogen and carbon monoxide for use in the chemical synthesis of oxygen containing organic compounds.

The water-gas shift reaction is represented stoichiometrically as follows:

$$CO + H_2O = CO_2 + H_2 \qquad (1)$$

About 16,700 B.t.u.'s are liberated for each pound mole of CO converted. Heat removal and temperature control are therefore necessary to prevent destruction of the catalyst and to attain the desired CO conversion. Ordinarily, the reaction temperature is held in the range of 350 to 1050° F. (depending upon the catalyst used) by such techniques as employing two or three fixed beds of catalyst of progressively increasing volume and by interbed cooling.

In such conventional systems, the exit temperature from the last bed is not the minimum shift gas temperature in the system as it should be from ideal considerations. Further, reaction rates are slow at the beginning of each bed, since the bed temperature is lowest at that point. These disadvantages and others found with conventional shift converters are overcome by the method disclosed in my copending application Ser. No. 880,254 filed concurrently herewith, and now pending.

The apparatus disclosed in this patent application is particularly useful for carrying out the water-gas shift reaction as disclosed in said copending application but is also useful in other exothermic and endothermic reaction systems, e.g., synthesis of hydrogen cyanamide and methanol.

SUMMARY

In one specific embodiment, the apparatus comprises a closed elongated vertical pressure vessel containing a removable sub-assembly comprising a plurality of axially aligned super-imposed heat exchangers attached to an axial spine. The spine comprises a plurality of concentric pipes which also provide passage for the heat transfer fluid to each of the heat exchangers.

In a specific example, a water-gas shift feed gas mixture containing supplemental $H_2O$ is passed consecutively through two heat exchangers embedded in conventional water-gas shift catalyst e.g., iron oxide-chromium oxide. By concurrent indirect heat exchange between the feed gas mixture containing supplemental $H_2O$ on the inside of the heat exchangers and the reacting gases on the outside of the heat exchangers, the temperature of the reactant gas is controlled in successive sections within the shift converter.

It is therefore a principal object of the present invention to provide a novel heat exchange apparatus.

Another object of this invention is to provide an improve chemical reactor comprising a unitary heat exchange assembly on a central spine.

A specific object of this invention is to provide in a single vessel, a catalytic reaction zone and heat exchange means for controlling reaction temperature.

These and other objects will be obvious to those skilled in the art from the following disclosures.

BRIEF DESCRIPTION OF THE DRAWING

The invention will be further understood by reference to the accompanying drawing in which:

FIG. 1 is diagrammatic representation of the heat exchange apparatus in vertical cross section taken along the line 1—1 of FIG. 2.

FIG. 2 is a horizontal cross sectional view of the apparatus of FIG. 1, taken along the line 2—2, of FIG. 1.

FIG. 3 is a horizontal cross sectional view of the apparatus of FIG. 1, taken along the line 3—3, of FIG. 1.

FIG. 4 is a fragmental vertical cross sectional view of the lower portion of the upper heat exchanger unit and the upper portion of the lower heat exchanger unit taken along line 4—4 of FIG. 3.

FIG. 5 is a perspective view of a typical heat exchange element.

FIG. 6 is a vertical cross sectional view of FIG. 5 taken through line 6—6 of FIG. 5.

FIG. 7 is a horizontal cross sectional view of FIG. 5, taken through line 7—7 of FIG. 5.

FIG. 8 is a graphical representation of a temperature profile illustrating average temperatures of reactants along the length of the shift converter in a specific example of a water-gas shift reaction.

DESCRIPTION OF THE PREFERRED EMBODIMENT

A preferred embodiment of the present invention pertains to an apparatus for conducting a novel catalytic water-gas shift conversion process. A short description of the water-gas shift process follows to enable one to better understand the nature of the apparatus.

Briefly, the aforesaid novel water-gas shift conversion process, involves adding supplemental $H_2O$ in the form of atomized water or steam to a CO-rich feed gas to form a water-gas shift feed gas mixture. The shift feed gas mixture is preheated by concurrent indirect heat exchange with another portion of the shift feed gas mixture undergoing exothermic water-gas shift reaction. This takes place in two successive heat exchangers which are embedded in a fixed bed of conventional water-gas shift catalyst. After being preheated, the shift feed gas mixture is passed through said fixed bed of shift catalyst where exothermic water-gas shift reaction takes place in three successive temperature controlled sections e.g., adiabatic, isothermal, and equilibrium-limited sections.

The shift converter may be operated at any pressure in the range of about 1 to 350 atmospheres and preferably in the range of about 10 to 200 atmospheres. With a high temperature catalyst, the maximum temperature in the reaction zone is determined by the thermal resistance of the catalyst.

Thus, in the adiabatic section of the catalyst bed, the temperature of the preheated shift feed gas mixture is quickly raised to the maximum that the catalyst may continuously withstand without destruction or substantial decrease in activity by the heat released by the exothermic water-gas shift reaction. For example, the maximum temperature is about 930° F. for conventional iron-chromium oxide shift catalyst.

The reacting feed gas mixture is then passed through a first heat exchange zone, referred to as the isothermal section, where said maximum temperature is held constant while the shift reaction continues until the actual composition of the reacting gases closely approaches the equilibrium composition of the mixture for the pressure and temperature of the isothermal section. Normally, the actual composition at the end of the isothermal section will equal the equilibrium composition for a temperature in the range of about 20 to 160° F. and preferably about 50° F. above the isothermal section temperature. Then to attain further CO conversion, the reacting gases are passed through a second heat exchange zone, referred to as the equilibrium-limited section. The water-gas shift reaction continues in the equilibrium-limited section at a reduced rate due to the lower temperature and reduced concentration of CO. The amount of CO conversion is facilitated in this section by decreasing the space velocity and by progressively lowering the temperature of the reacting feed gas along the length of the section as a function of CO concentration. At any specific point along the length of the equilibrium limited section, the actual temperature of the feed gas is held in the range of about 20–160° F. and preferably about 50° F., lower than the apparent equilibrium temperature corresponding to the equilibrium constant for the composition of the reacting feed gas at that point. The heat transfer requirements in the isothermal and equilibrium-limited zones may be shown to be of an exponentially decreasing function versus length. These requirements are matched by indirect concurrent flow heat transfer between the gases undergoing water-gas shift reaction and the heat exchange fluid. A typical temperature profile for reacting gases undergoing shift reaction along the length of the shift converter is shown in FIG. 8 of the drawing and will be discussed later with respect to the example. Thus, in a preferred embodiment of my invention the feedstream to my chemical reactor comprises a continuous stream of reactants which is introduced into a heat exchange assembly as the heat exchange fluid before being introduced into a reaction zone where it is chemically reacted. The feed gas mixture is thereby heated by the reacting feed gas which it cools, at a decided economic advantage.

The present invention constitutes a preferred apparatus for carrying out the aforesaid process. It essentially comprises a closed elongated vertical pressure vessel containing a removable sub-assembly comprising two axially aligned superimposed heat exchangers attached to a common axial spine. The spine extends throughout a substantial portion of the column and comprises two concentric pipes which also provide passage for the heat exchange fluid to each of the heat exchangers. Provision is also made for adding a temperature moderating fluid such as supplemental $H_2O$ in the form of water or steam, to the feedstream. In operation, substantially all of the space within the shell of the vessel which is unoccupied by the aforesaid sub-assembly may be filled with a conventional catalyst.

DESCRIPTION OF THE DRAWING

A more complete understanding of the invention may be had by reference to the accompanying drawing which illustrates in FIGS. 1 through 7 a preferred embodiment of this invention.

As shown in FIGS. 1 to 4 inclusive, shift converter 11 is an elongated vertical pressure vessel and is represented in this embodiment as an upright cylindrical gastight metal column essentially comprising: cylindrical shell body 12, upper cover 13, lower cover 14, support legs 15, spine sub-assembly 16, upper heat exchanger 17, and lower heat exchanger 18.

Cylindrical shell body 12 is provided with circumferential body flanges 19 and 20 respectively located near its upper and lower end portions. Upper cover 13 is provided with circumferential cover flange 21, discharge port 22 for the product gas, and seal 23 through which passes the upper end of the spine sub-assembly 16. Lower cover 14 is provided with circumferential cover flange 24 and water atomizers 25 and 26. Support legs 15 are attached to the lower end of shell body 12, and hold the column in an upright position.

Spine sub-assembly 16 essentially comprises two concentric pipes, e.g., center pipe 28 and other pipe 29. These pipes are spaced apart by means of two annulus plates, e.g., upper annulus plate 30 and intermediate annulus plate 31. These plates divide the annulus passage along the length of the spine into upper section 32 which is closed at each end and lower section 33 which is open at its lower end and closed at its upper end. Center pipe 28 is provided with two discs e.g., intermediate disc 34 and bottom disc 35. These discs divide the center pipe into an upper section 36 which is open at its upper end and closed at its bottom end and a lower section 37, which is closed at each end.

The two superimposed heat exchangers e.g., upper heat exchanger 17 and lower heat exchanger 18 are supported respectively by four pairs of upper I-beam cantilevered supports 38 and four pairs of lower I-beam cantilevered supports 39. Each pair of I-beam supports are fixed to outer pipe 29 and are spaced 90° apart. Thus, spine sub-assembly 16 with attached heat exchangers 17 and 18 form a single unit which may be easily withdrawn from the top of column 11 after seal 23 is detached from the flanged end of center pipe 16 and upper cover 13 is removed. However, before removing spine sub-assembly 16, shell 12 is first emptied of catalyst from the bottom. This may be done by removing bottom cover 14, perforated catalyst support plate 40, catalyst support plate ring 41 and $H_2O$ atomizers 25 and 26.

Upper heat exchanger 17 comprises four sets of vertical heat exchange elements 42. Each set of elements is spaced 90° from the next set and contains a plurality e.g., six are shown for illustrative purposes of heat exchange elements 42 of varying sizes which rest on I-beam supports 38 and are fed by one of four cantilevered lower feed manifolds 43 (see FIG. 2). One end of each feed manifold 43 pierces center pipe 28, thereby forming the four interconnecting passages 44. Similarly, the four sets of heat exchange elements 42 discharge into the four cantilevered upper return manifolds 45, spaced 90° apart (see FIG. 3). One end of each return manifold 45 pierces outer pipe 29, thereby forming the four interconnecting passages 46.

In the same manner as described for upper heat exchanger 17, the lower heat exchanger 18 comprises four sets of vertical heat exchange elements 47. Each set of heat exchange elements is spaced 90° apart and contains a plurality e.g., six are shown for illustrative purposes, of heat exchange elements 47 of varying sizes which rest on I-beam supports 39 and which are fed by one of four cantilevered lower feed manifolds 48. One end of each feed manifold 48 pierces center pipe 28, thereby forming four interconnecting passages 49. Similarly, the four sets of heat exchange elements 47 discharge into four cantilevered upper return mani-folds 50 spaced 90° apart. One end of each return manifold 50 pierces outer pipe 29, thereby forming the four interconnecting passages 51.

FIGS. 5 to 7 inclusive show a typical heat exchange element 42 or 47 comprising a metal plate containing in this embodiment ten vertical cooling channels 60 connected together at the bottom by a horizontal coolant distribution channel 61, at the top of a horizontal coolant collection channel 62 and in between by two horizontal pressure equalizing channels 63. The coolant enters the heat exchange element by way of flanged pipe 64 and departs by way of flanged pipe 65. The heat exchange elements 42 and 47 are fastened respectively to I-beams 38 and 39 by means of angle clips 66. Flanged pipe 64 at the inlet to each heat exchange element is connected to lower feed manifolds 43 and 48 by means of adapters 67 and 68 respectively. Similarly, flanged pipe 65 at the discharge end of each heat exchange element is connected to upper discharge manifolds 45 and 50 by means of expandible adapters 69 and 70 respectively.

Heat exchange elements 42 or 47 may be made by forming a left hand and right hand pattern of semicircular channels in two light gauge metal sheets, assembling the sheets together to form a pattern of circular channels and land areas, and fusing the land areas together.

Although not shown in the drawing, during operation column 11 is covered on the outside with suitable insulation to prevent heat loss to the surroundings. Conventional high temperature insulation may be used, e.g., rock wool, glass wool, or bonded insulation of diatomaceous silica plus asbestos fiber.

To operate the catalytic water-gas shift converter 11, catalyst support plate 40 and bottom cover 14 are put in place. Spine sub-assembly 16 is then inserted into shell 12 until I-beam 39 rests on a bottom support, for example the inside ledge of flange 20 at the bottom of shell 12. The bottom end of outside pipe 29 slides past the top of ring 41 on the inside and near the top. Water atomizer 25 is pushed through gas-tight sleeve bushings located in bottom head 14 and in bottom plate 35 and into the bottom area of center pipe 37. With top cover 13 off, conventional iron-oxide-chromium oxide catalyst tablets about ¼" to ⅜" diameter are shoveled into shell 12 to fill the entire space on the shell side of the vessel which is unoccupied by spine-assembly 16. Plenum chamber 76 between upper cover 13 and upper return manifold 45 is free from catalyst. Pressure vessel 11 is then closed by putting top cover 13 in place, and clamping flexible gas-tight seal 23 against the flanged end of center pipe 28.

Water-gas shift feed stream comprising a CO-rich gas mixture including supplemental steam or atomized water is passed down center pipe 28, through passages 44 and into the four bottom feed manifolds 43 of upper heat exchanger 17. The feed stream is then passed through holes 71 in feed manifolds 43, adapters 67, and into a plurality e.g. twenty-four are shown for illustrative purposes of heat exchange elements 42 by way of flanged inlet pipes 64. Then the feedstream is passed up through vertical passages 60 (see Figure 5) in heat exchange elements 42 in indirect concurrent heat exchange with the reactant gases undergoing catalytic water-gas shift conversion on the outside of heat exchange elements 42. The feedstream is then passed out of heat exchange elements 42 through flanged pipes 65. It is then passed into the four upper return manifolds 45 by way of expandible adapters 69 and holes 72.

The feedstream is passed out of upper heat exchanger 17 through holes 46 at the ends of upper return manifolds 45, down through annulus 32, and then into the bottom portion 37 of center pipe 28 by way of holes 73 in the walls of center pipe 28. If desired atomized water or steam from line 25 may be then mixed with the feedstream in bottom of center pipe 37, before the mixture is introduced into the four lower feed manifolds 48 by way of passages 49. The feedstream is then passed through holes (not shown) in manifolds 48 similar to holes 71 in FIG. 2 adapters 68 and into the flanged inlet pipes 64 of the twenty-four lower heat exchange elements 47. Then the feedstream is flowed up through vertical passages 60 (see FIG. 5) in heat exchange elements 47 in indirect concurrent heat exchange with the reactant gases undergoing catalytic water-gas shift conversion on the outside of the heat exchange elements 47. The feedstream is then passed out of the heat exchange elements 47 through flanged pipes 65 and into the four upper return manifolds 50 by way of adapters 70 and holes (not shown) in the manifolds similar to holes 72 in FIG. 3.

The feedstream is then passed from lower heat exchanger 18 through holes 51 at the ends of upper return manifolds 50, down through the lower section of annulus 33, and then into the inside of ring 41. From there, the feedstream is passed through a plurality holes 74 in the wall of ring 41 and into plenum chamber 75 located between lower cover 14 and catalyst support plate 40. If desired atomized water or steam from line 26 may be mixed with the feedstream inside of ring 41.

The feedstream is then passed longitudinally up through the entire length of the pressure vessel on the shell side where it undergoes catalytic shift reaction. The flow of the reactants through the reactor is orderly with "nonback-mix," i.e., no element of fluid overtaking any other element, also referred to as "plug flow." The residence time in the reactor is the same for all elements of the fluid.

The temperature profile of the reactant gas on the shell side of the pressure vessel in °F. is shown in FIG. 8 as a function of the volume of catalyst contacted in cubic feet. $V_1$ represents the volume of catalyst in the adiabatic section of the shift converter through which the reactant gases pass. The adiabatic section is bounded by the catalyst support plate and the lower manifold 48 of the lower heat exchanger 18. There is substantially no heat exchange in this area and the temperature of the reactants may be increased to a maximum that the catalyst will withstand over an extended period without destruction. Temperature control in this area is exercised primarily by controlling the inlet temperature and composition of the reactants, and also the space velocity.

The hot reactant gases leave the adiabatic section and are passed into the isothermal section on the shell side of lower heat exchanger 18 where the reaction continues while the temperature is held substantially constant at the maximum by lower heat exchanger 18. The isothermal section is bounded by the upper end of the adiabatic section and the top of lower heat exchanger 18. The volume of catalyst contacted by the gases leaving the isothermal section is shown in FIG. 8 as $V_2-V_1$.

The reactant gases are then flowed freely into the equilibrium-limited section on the shell side of upper heat exchanger 17 where the reaction continues while the temperature is reduced exponentially at a specific rate. The equilibrium-limited section is bounded by the upper end of the isothermal section and the top of the upper heat exchanger 17. Temperature is controlled in this section by upper heat exchanger 17. The total volume of catalyst contacted by the gases leaving this last section is shown in FIG. 8 as $V_3-V_2$.

The product gases are then passed into plenum chamber 76 between upper cover 13 and the top of heat exchanger 17 and finally out through discharge port 22.

EXAMPLE

Twenty-five million standard cubic feet per day (MM s.c.f.d.) of hydrogen may be produced by the apparatus shown in the drawing, whereby water-gas shift converter 11 comprises a vertical steel pressure vessel 7¼ feet in diameter by 32 feet high. Heat exchangers 17 and 18 comprise respectively 7500 ft.$^2$ and 5300 ft.$^2$ of external cooling area. The catalyst on the shell side of the heat exchangers is iron-oxide 85 to 95 weight percent and chromium oxide 5 to 15 weight percent. The volume of the catalyst in the adiabatic, isothermal, and equilibrium-controlled sections of the shift converter is shown in Table I. 29.3 MM s.c.f.d. of saturated water-gas shift feedstream (dry basis) at a temperature of 411° F. and a pressure of 515 p.s.i.g. are mixed with 67.7 million (MM) lbs. per day of $H_2O$. The feed gas mixture having the composition shown in Table I is introduced into the lower feed manifold 43 of upper heat exchanger 17 by way of center pipe 28. The shift feedstream absorbs heat as it passes up through heat exchanger 17 and its temperature in the lower feed manifold 48 of lower heat exchanger 18 is 660° F. No additional water is added to the feedstream at this time; but atomized water is available if needed by way of line 25. The feedstream picks up additional heat in heat exchanger 18 and enters plenum chamber 24 at a temperature of 880° F. No additioinal water is added to the feedstream at this time; but atomized water is available if needed by way of line 26.

The shift feedstream then enters the adiabatic section of the reactor where catalytic water-gas shift reaction takes place and the temperature is increased to 930° F. The reacting gas is then passed into the isothermal section where the temperature is maintained at 930° F. until 77 mole percent of the CO in the feed is converted. Then, the reacting gases are passed through the equilibrium-limited section where the temperature is reduced exponentially. At any point in this section the temperature is controlled by heat exchange so that it is less than the temperature corresponding to the equilibrium constant for the composition of the reacting gas at that point by a small amount within the range of 20 to 160° F. and preferably about 50° F. lower. The product gas exits from discharge port 22 at a temperature of 675° F. 90.4 mole percent of the CO in the feedstream is converted.

See Table I for a summary of the operating conditions and a gas analysis of the feedstream at various locations in shift converter 11.

The advantages of my invention are not limited to catalytic water-gas shift conversion. The principles of heat exchange described can be applied to other fluids and other reactions including gaseous and liquid fuels and exothermic and endothermic reactions with or without catalyst. The invention therefore is not restricted to the particular reaction in the above example, namely water-gas shift reaction, nor to the specific choice of $H_2O$ as the temperature moderator. The specific example does, however, illustrate a practical construction of a water-gas shift converter which can be applied to various problems by those skilled in the art. At least one and preferably two heat exchange units may be employed of varying sizes and number of elements, depending upon the heat exchange requirements.

Further, depending upon the job to be done by the apparatus, the heat exchange fluid and the reactant stream may be different; the diameter of the various sections of the vessel may differ; the vessel may lie horizontal instead of vertical; the flow of the streams in the apparatus may be reversed; and an inverted configuration may be provided for by which the product exits from the reactor at the bottom.

TABLE I

|  | Feed gas in manifold 43 | Feed gas in plenum chamber 48 | Feed gas in plenum chamber 74 | Reactant gas leaving adiabatic section | Rectant gas leaving isothermal section | Product gas leaving equilibrium limited section | Overall |
|---|---|---|---|---|---|---|---|
| Reactor volume, cu. ft. |  |  |  |  |  |  | 1,240 |
| Catalyst volume, cu. ft. |  |  |  | 15 | 254 | 357 | 626 |
| Temperature, °F. | 411 | 660 | 880 | 930 | 930 | 675 |  |
| Pressure, p.s.i.g. | 515 | 512 | 510 | 510 |  | 465 |  |
| Gas composition mole percent feed, dry basis: |  |  |  |  |  |  |  |
| CO | 48.7 | 48.7 | 48.7 | 43.0 | 11.2 | 4.7 |  |
| $CO_2$ | 3.8 | 3.8 | 3.8 | 9.5 | 41.4 | 47.8 |  |
| $H_2$ | 45.8 | 45.8 | 45.8 | 51.5 | 83.3 | 89.8 |  |
| Inerts | 1.7 | 1.7 | 1.7 | 1.7 | 1.7 | 1.7 |  |
| $H_2O$ | 127.8 | 127.8 | 127.8 | 122.1 | 90.2 | 83.7 |  |
| $H_2O$/CO mole ratio | 2.6 | 2.6 | 2.6 | 2.9 | 8.1 | 17.9 |  |
| $H_2O$ added, percent mole dry feed | 12.8 | 0 | 0 | 0 | 0 |  |  |
| Space velocity, SCFH dry feed/ft.³ cat. |  |  |  | 78,100 | 4,760 | 3,390 | 1,890 |
| Conversion, percent mole CO in dry feed |  |  |  | 11.7 | 77.1 | 90.4 | 90.4 |

I claim:

1. Heat exchange apparatus comprising an elongated closed vessel, an axial spine extending substantially the length of said vessel and structurally supporting other internal elements within said vessel as a removable unit, said axial spine comprising a center pipe closed at the lower end and having an open upper end which serves as the inlet for fresh feed gas and a concentric coaxial pipe disposed longitudinally about the outside of said center pipe providing an annular passage therebetween, said annular passage being closed at the top and opening at the bottom into a chamber at the bottom of the vessel, heat exchange means embedded in catalyst within said vessel and attached to said axial spine, said heat exchange means having an inlet in communication with said center pipe for receiving fresh feed gas from said center pipe and having an outlet in communication with said annular passage through which gas is discharged, a perforated plate covering said bottom chamber for supporting said catalyst, and an exit port in the upper end of said vessel; wherein feed gas is introduced into and discharged from said heat exchange means by way of said axial spine, and the gas stream is then axially passed from the bottom chamber to said exit port through said catalyst in indirect concurrent heat exchange with the gas flowing within said heat exchange means.

2. A chemical reactor and heat exchange apparatus comprising an elongated body shell provided with top and bottom heads; a heat exchange assembly embedded in catalyst and positioned within said body shell and capable of being removed therefrom as a unit comprising a central axial conduit whose upper outside end is sealed to said top head and whose bottom end is closed and which extends through a perforated catalyst support plate near the lower end of said body shell and into an end chamber at the bottom of the body shell, an intermediate partition dividing said central conduit into an upper section having an open upper end through which the fresh reactant feed stream enters and a closed lower section, a concentric coaxial conduit disposed longitudinally about said central conduit providing an annular passage therebetween, partitioning means for dividing said annular passage into a closed upper section and a lower section which discharges into said end chamber, the top of the lower section of said central conduit being in communication with the bottom of the upper section of said annular passage, an upper heat exchanger comprising a plurality of upper inlet manifolds extending from the bottom of the upper section of said central conduit and in communication therewith, a plurality of upper outlet manifolds extending from the top of the upper section of said annular passage and in communication therewith, and a plurality of upper heat exchange passages disposed between said upper inlet and outlet manifolds and in communication therewith, a lower heat exchanger comprising a plurality of lower inlet manifolds extending from the bottom of the lower section of said central conduit and in communication therewith, a plurality of lower outlet manifolds extending from the top of the lower section of said annular passage and in communication therewith, and a plurality of lower heat exchange passages disposed between said lower inlet and outlet manifolds and in communication therewith; and an outlet conduit in said top head; wherein said fresh reactant feed stream enters through said upper section of central conduit and flows up through said upper heat exchanger and down through said upper section of annular passage and into said lower section of central conduit and into said end chamber, then up through said catalyst in indirect concurrent heat exchange with the feed stream flowing up through each heat exchanger and finally the stream is discharged through said outlet conduit in said top head.

3. A chemical reactor according to claim 2 with the addition of means for selectively introducing a temperature moderating fluid into the lower section of said center conduit and into the end chamber.

References Cited

UNITED STATES PATENTS

| | | | |
|---|---|---|---|
| 2,051,774 | 8/1936 | Kleinschmidt | 23—288 |
| 3,440,021 | 4/1969 | Niedetzky et al. | 23—298 |
| 2,723,651 | 11/1955 | Bliss | 122—333 |

JAMES H. TAYMAN, JR., Primary Examiner

U.S. Cl. X.R.

23—199, 213, 284, 289; 48—197; 122—333; 165—140, 157